United States Patent
Rana et al.

(10) Patent No.: US 10,846,642 B2
(45) Date of Patent: Nov. 24, 2020

(54) METHOD AND SYSTEM FOR OPPORTUNITY IDENTIFICATION IN COGNITIVE DECISION MAKING PROCESS

(71) Applicant: Diwo, LLC, Northville, MI (US)

(72) Inventors: Satyendra Pal Rana, Northville, MI (US); Chandra Puttanna Keerthy, Northville, MI (US); Krishna Prakash Kallakuri, Northville, MI (US)

(73) Assignee: DIWO, LLC, Northville, MI (US)

( * ) Notice: Subject to any disclaimer, the term of this patent is extended or adjusted under 35 U.S.C. 154(b) by 470 days.

(21) Appl. No.: 15/788,603

(22) Filed: Oct. 19, 2017

(65) Prior Publication Data

US 2018/0114165 A1   Apr. 26, 2018

Related U.S. Application Data

(60) Provisional application No. 62/410,746, filed on Oct. 20, 2016.

(51) Int. Cl.
 *G06Q 10/00* (2012.01)
 *G06Q 10/06* (2012.01)
 (Continued)

(52) U.S. Cl.
 CPC ..... *G06Q 10/0637* (2013.01); *G06F 11/1474* (2013.01); *G06F 16/2465* (2019.01);
 (Continued)

(58) Field of Classification Search
 None
 See application file for complete search history.

(56) References Cited

U.S. PATENT DOCUMENTS 4,805,225 A    2/1989 Clark
7,305,351 B1 * 12/2007 Bechhofer ......... G06Q 10/0635
                                                      705/7.28
(Continued)

OTHER PUBLICATIONS

Chandrika Kamath, Data Mining and Pattern Recognition for Large-Scale Scientific Data, Center for Applied Scientific Computing Lawrence Livermore National Laboratory, Oct. 15, 1998.
(Continued)

*Primary Examiner* — Gurkanwaljit Singh
(74) *Attorney, Agent, or Firm* — FisherBroyles, LLP; Susan M. Oiler (57) ABSTRACT

The present disclosure relates to opportunity sensing system(s) and method(s) to identify a business opportunity from a set of business opportunities associated with an organization for cognitive decision-making process. In one embodiment, the method comprises receiving a set of batch data associated with a set of symptoms indicative of a business opportunity from a set of business opportunities associated with an organization and obtaining metadata data associated with the business opportunity. The method further comprises detecting one or more symptoms for the set of symptoms based on analysis of the first set of data and the metadata and generating a reason associated with the detected one or more symptom based on execution of a root cause analysis methodology using the metadata data. The method furthermore comprises identifying a business opportunity from the set of business based on the generated reason.

12 Claims, 5 Drawing Sheets

(51) Int. Cl.
*G06F 11/14* (2006.01)
*G06F 16/2458* (2019.01)
*H04W 24/02* (2009.01)
*H04L 12/24* (2006.01)

(52) U.S. Cl.
CPC ..... *G06Q 10/0639* (2013.01); *G06F 2201/82* (2013.01); *H04L 41/082* (2013.01); *H04L 41/0836* (2013.01); *H04W 24/02* (2013.01)

(56) References Cited

U.S. PATENT DOCUMENTS

| | | | |
|---|---|---|---|
| 8,031,201 B2 | 10/2011 | Snowden et al. | |
| 8,200,527 B1 * | 6/2012 | Thompson | G06Q 10/06398 705/7.39 |
| 8,204,809 B1 * | 6/2012 | Wise | G06Q 40/06 705/35 |
| 8,214,238 B1 * | 7/2012 | Fairfield | G06Q 10/0639 705/7.11 |
| 8,311,863 B1 * | 11/2012 | Kemp | G06Q 10/0639 705/7.11 |
| 2003/0130884 A1 * | 7/2003 | Michaluk | G06Q 10/06393 705/7.36 |
| 2007/0094060 A1 * | 4/2007 | Apps | G06Q 10/0637 705/7.36 |
| 2007/0174185 A1 * | 7/2007 | McGoveran | G06Q 40/00 705/39 |
| 2008/0015871 A1 * | 1/2008 | Eder | G06Q 10/067 706/21 |
| 2009/0018891 A1 * | 1/2009 | Eder | G06Q 10/06375 705/7.28 |
| 2009/0099887 A1 * | 4/2009 | Sklar | G06Q 10/00 705/7.41 |
| 2013/0339099 A1 * | 12/2013 | Aidroos | G06Q 10/0637 705/7.36 |
| 2014/0058794 A1 * | 2/2014 | Malov | G06Q 10/083 705/7.31 |
| 2016/0112822 A1 * | 4/2016 | Giral | H04W 24/02 455/414.1 |

OTHER PUBLICATIONS

Stephan Spiegel, Julia Gaebler, Andreas Lommatzsch Ernesto De Luca, Sahin Albayrak, "Pattern Recognition and Classification for Multivariate Time Series", Technische Universitaet Berlin., 2011.

* cited by examiner

METHOD AND SYSTEM FOR OPPORTUNITY IDENTIFICATION IN COGNITIVE DECISION MAKING PROCESS

CROSS REFERENCE TO RELATED APPLICATIONS

This patent application claims priority from U.S. Provisional Application No. 62/410,746 filed on Oct. 20, 2016, the entirety of which is hereby incorporated by reference.

TECHNICAL FIELD

The present disclosure in general relates to the field of cognitive computing. More particularly, the present subject matter relates to a system and a method to identify a business opportunity from a set of business opportunities associated with an organization for cognitive decision-making process.

BACKGROUND

Now a day, to survive and grow in an increasingly complex global economy, organizations strive to find newer and newer methods to improve their performance and competitiveness. Most businesses, large and small, sought to improve business performance by streamlining their processes. The trend has been fueled by digitization, internet of things, and developments in advanced analytics.

Pattern recognition is a branch of machine learning that focuses on the recognition of patterns and regularities in data, although it is in some cases considered to be nearly synonymous with machine learning. Generally, conventional methods and systems based on known pattern recognition methodologies, for business improvements, fail to understand opportunities in business when implemented in the context of modern businesses. This is due to the transient nature of business opportunities and also due to the diffusion of predictors across multiple dynamic streams of data. In particular, the conventional methods and systems are unable to sense opportunity in a cognitive decision-making process.

SUMMARY

Before the present a system and a method to identify a business opportunity from a set of business opportunities associated with an organization for cognitive decision making process, are described, it is to be understood that this application is not limited to the particular systems, and methodologies described, as there can be multiple possible embodiments, which are not expressly illustrated in the present disclosures. It is also to be understood that the terminology used in the description is for the purpose of describing the particular implementations, versions, or embodiments only, and is not intended to limit the scope of the present application. This summary is provided to introduce aspects related to a system and a method to identify a business opportunity from a set of business opportunities associated with an organization for cognitive decision-making process. This summary is not intended to identify essential features of the claimed subject matter nor is it intended for use in determining or limiting the scope of the claimed subject matter.

In one embodiment, a method to identify a business opportunity from a set of business opportunities associated with an organization for cognitive decision making process is disclosed. In the embodiment, the method comprises the step of receiving a set of batch data associated with a set of symptoms indicative of a business opportunity from a set of business opportunities associated with an organization. In one example, each of the one or more symptoms comprises a pattern and instruction to collate data associated with the pattern. In one other example, the set of batch data may comprise data filtered from a real-time stream of data based on the one or more symptoms. Upon receiving, the method comprises the step of obtaining metadata data associated with the business opportunity. In one example, the metadata comprises one or more of historical data associated with the symptom. Further to obtaining, the method comprises the step of detecting one or more symptoms for the set of symptoms based on analysis of the first set of data and the metadata and generating a reason associated with the detected one or more symptom based on execution of a root cause analysis methodology using the metadata data. Subsequent to generating, the method comprises the step of identifying a business opportunity from the set of business based on the generated reason.

In another embodiment, a system to identify a business opportunity from a set of business opportunities associated with an organization for cognitive decision-making process is disclosed. The system comprises a memory and a processor coupled to the memory, further the processor may be configured to execute programmed instructions stored in the memory. In one embodiment, the system may receive a set of batch data associated with a set of symptoms indicative of a business opportunity from a set of business opportunities associated with an organization. In one example, each of the one or more symptoms comprises a pattern and instruction to collate data associated with the pattern. In one more example, the set of batch data may comprise data filtered from a real-time stream of data based on the one or more symptoms. Further, the system may obtain metadata data associated with the business opportunity. In one example, the metadata comprises one or more of historical data associated with the symptom. Furthermore, the system may detect one or more symptoms for the set of symptoms based on analysis of the first set of data and the metadata and generate a reason associated with the detected one or more symptom based on execution of a root cause analysis methodology using the metadata data. Subsequently, the system may identify a business opportunity from the set of business based on the generated reason.

In yet another implementation, non-transitory computer readable medium embodying a program executable in a computing device for sensing of opportunity in a cognitive decision-making process is disclosed. The program may comprise a program code for receiving a set of batch data associated with a set of symptoms indicative of a business opportunity from a set of business opportunities associated with an organization. In one example, each of the one or more symptoms may comprise a pattern and instruction to collate data associated with the pattern. In one other example, the set of batch data may comprise data filtered from a real-time stream of data based on the one or more symptoms. The program may comprise a program code for obtaining metadata data associated with the business opportunity. In one example, the metadata may comprise one or more of historical data associated with the symptom. The program may comprise a program code for detecting one or more symptoms for the set of symptoms based on analysis of the first set of data and the metadata. The program may comprise a program code for generating a reason associated with the detected one or more symptom based on execution of a root cause analysis methodology using the metadata data. The program may comprise a program code for identifying a business opportunity from the set of business based on the generated reason.

BRIEF DESCRIPTION OF THE DRAWINGS

The foregoing detailed description of embodiments is better understood when read in conjunction with the appended drawing. For the purpose of illustrating the disclosure, there is shown in the present document example constructions of the disclosure; however, the disclosure is not limited to the specific methods and apparatus disclosed in the document and the drawings.

The detailed description is described with reference to the accompanying figure. In the figure, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and method to identify a business opportunity from a set of business opportunities associated with an organization for cognitive decision making process, similar or equivalent to those described herein can be used in the practice or testing of embodiments of the present disclosure, the exemplary, system and method to identify a business opportunity from a set of business opportunities associated with an organization for cognitive decision making process are now described.

Various modifications to the embodiment will be readily apparent to those skilled in the art and the generic principles herein may be applied to other embodiments to synthesis a business opportunity identified from a set of business opportunities corresponding to an organization for a cognitive decision-making process. However, one of ordinary skill in the art will readily recognize that the present disclosure to identify a business opportunity from a set of business opportunities associated with an organization for cognitive decision making process is not intended to be limited to the embodiments described, but is to be accorded the widest scope consistent with the principles and features described herein.

In the present disclosure, a business opportunity may be understood as a transient circumstance that comes along the way of a business operation and which needs to be handled strategically in order to promote the business. In other words, the business opportunity may be understood as an opportunity for an organization to gain a profit, reduce a loss, or maintain its hold in the market. Though organization identify these business opportunities, however identifying these business opportunities in real time or even predicting the business opportunities is the key to success. It may be noted that the opportunity sensing system may identify a business opportunity for which a strategy may be implemented. However, for implementing the strategy effective a basis of identifying the business opportunity is necessary. In addition, accuracy is critical, as wrong identification may lead to loss of time and effort. Therefore, it becomes further important to provide the symptom of the business opportunity along with the root cause of the business opportunity to the user and the system implementing a cognitive decision making process.

In one embodiment, a system and a method to identify a business opportunity from a set of business opportunities associated with an organization for cognitive decision making process, is disclosed. In the embodiment a set of business opportunities may be received from a user within an organization and one or more symptoms associated with the one or more business opportunities from the set of business opportunities may be generated based on a and metadata. In one example, the metadata may comprise descriptions of data streams to be examined, business goals to be considered, business policies to be followed, predefined thresholds to be used for determining interestingness of the opportunity. In one example, the description of real-time data stream to be filtered may comprise the location of data origin, data type, data structure, frequency of data. Further business goal and business policies may be set by the organization. Furthermore, predefined threshold of interestingness of the opportunity ness may be an amount of profit/loss that the business opportunity indicates, or an importance of a business opportunity. In one example, the symptoms may comprise patterns and instructions for collecting data corresponding to the pattern. Upon generating the one or more symptoms, a matrix mapping the business opportunity and the symptoms is generated. In one example, multiple business opportunity may be mapped to a single symptom and vices versa.

Further, in the embodiment, a set of batch data associated may be received. In one example, the set of batch data may be developed based on filtering of real time data using the one or more symptoms and the metadata. Upon receiving, addition metadata data associated with the business opportunity may be obtained, wherein the metadata comprises one or more of historical data associated with the symptom, historical data associated with object being analyzed by the symptom for example, customers, location, competitors and the like. Further to obtaining, one or more symptoms for the set of symptoms may be detected based on analysis of the set of data and the metadata. In one example, the detection may be understood as eliminating errors, deviations, filtering data associated with the one or more symptom in the batch data. Subsequently, a reason associated with the detected one or more symptom may be generated based on execution of a root cause analysis methodology using the metadata data. In one example, the reasons for the existence of the symptom may be selected from a predefined template based on the analysis of the set of batch data and the metadata. In one example, the metadata may comprise indications and data points of the reason of the symptoms. In the example, the indications and data points in the metadata is extrapolated to generate a reason. The reason may be one of a present/absent or conclusive/inconclusive. Further, the reason may comprise a write up generated using natural language process or selected from a template and indications/data points from the metadata. Further to generating, a business opportunity may be identified from the set of business based on the generated reason. In one example, if the generated reason is yes or conclusive the business opportunity associated with the reason is identified.

In the embodiment, upon identifying the one or more symptoms detected, and the reason generated may be appended to the business opportunity. Further, upon receiving one or more requests from the user a status of business opportunity identification, list of error logs, the business opportunity, one or more symptoms, and the reason may be displayed to the user. Furthermore, a report may be generated based on the user request.

Figure 1:
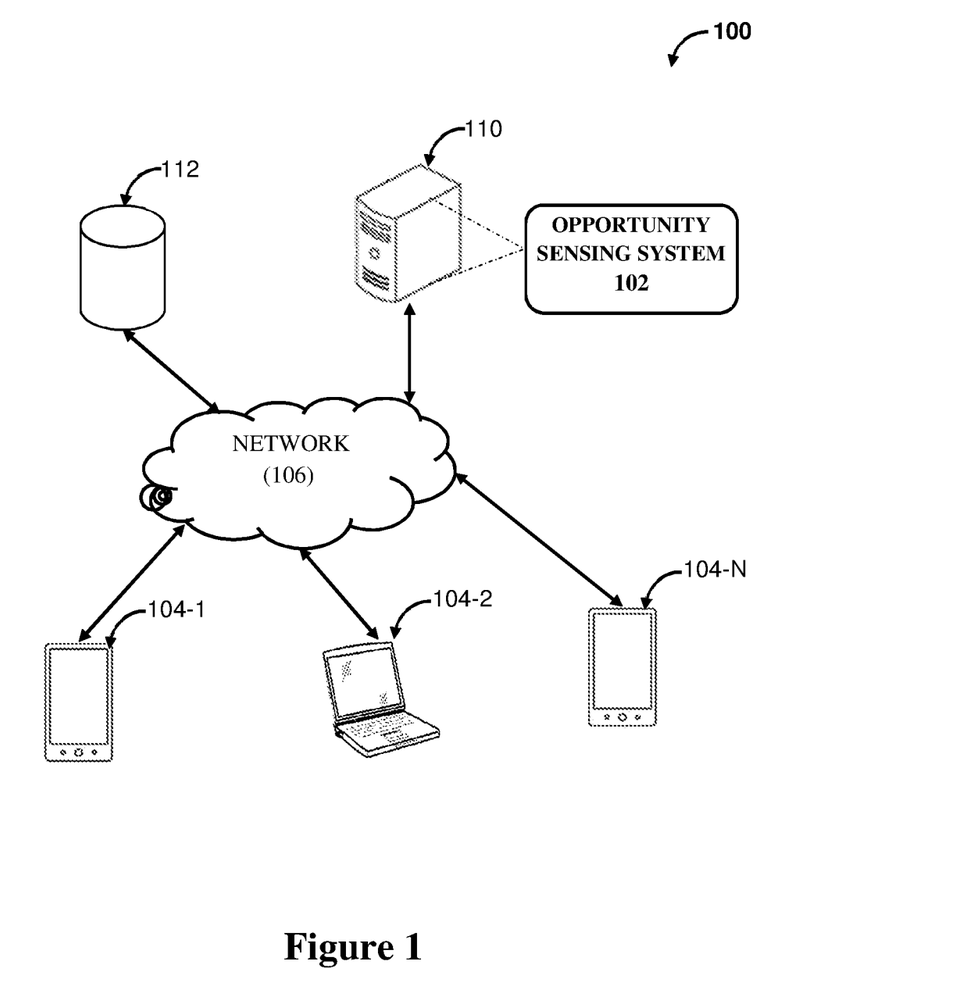
FIG. 1 illustrates a network implementation of an opportunity sensing system to identify a business opportunity from a set of business opportunities associated with an organization for cognitive decision making process is shown, in accordance with an embodiment of the present disclosure.

Referring now to FIG. 1, a network implementation 100 of an opportunity sensing system 102 to identify a business opportunity from a set of business opportunities associated with an organization for cognitive decision-making process is disclosed. It may be understood that the present disclosure is explained considering that the opportunity sensing system 102 is implemented on a server 110. Further it may also be understood that the opportunity sensing system 102 may be implemented variety of computing systems, such as a mobile communication device (such as a smartphone), a laptop computer, a desktop computer, a notebook, a workstation, a mainframe computer, a server, a network server, and the like. It will be understood that the opportunity sensing system 102 may be accessed by multiple users through one or more user devices 104-1, 104-2 . . . 104-N. Examples of the user devices 104 may include, but are not limited to, a portable computer, a personal digital assistant, a handheld device, and a workstation. The user devices 104 are communicatively coupled to the opportunity sensing system 102 through a network 106. Further, the opportunity sensing system 102 may be communicatively coupled to a knowledge database 112 though the network 116.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may be either a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
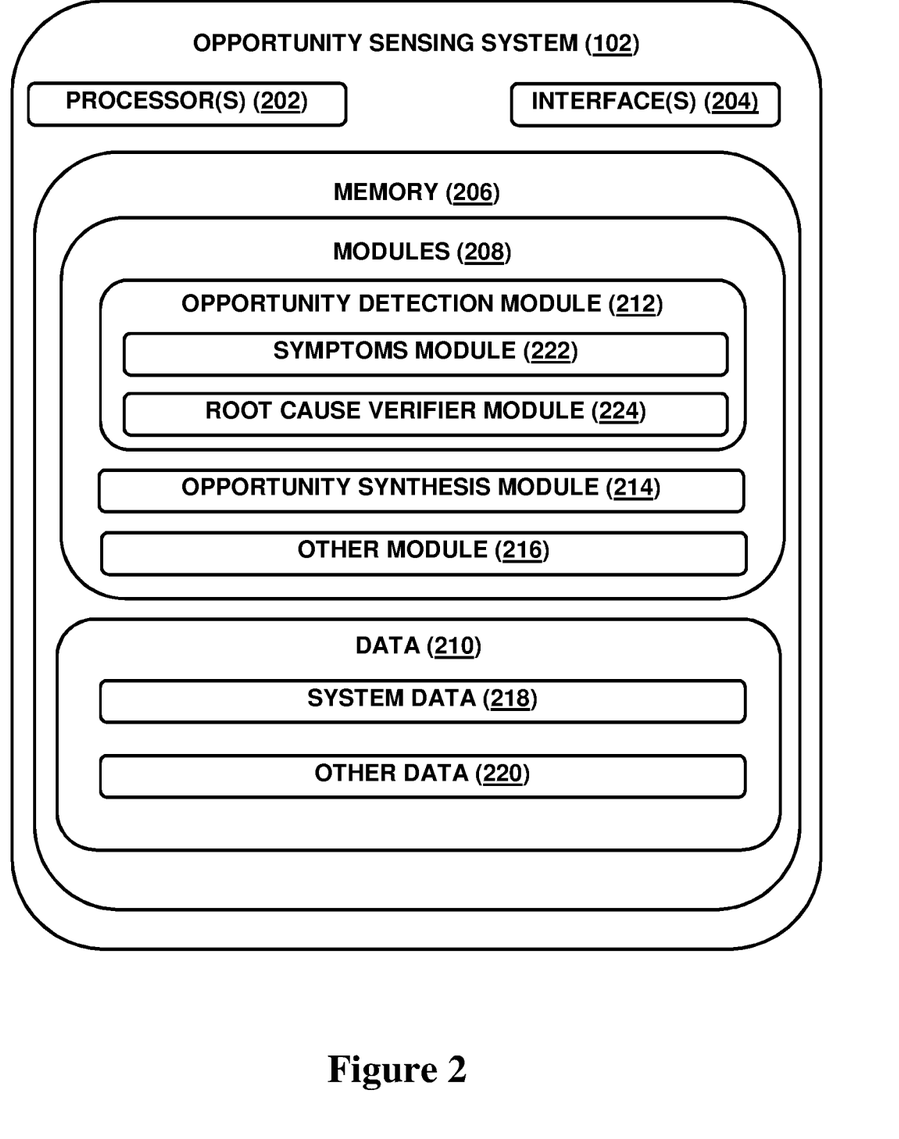
FIG. 2 illustrates the opportunity sensing system to identify a business opportunity from a set of business opportunities associated with an organization for cognitive decision-making process, in accordance with an embodiment of the present disclosure.

Referring now to FIG. 2, the opportunity sensing system 102 to identify a business opportunity from a set of business opportunities associated with an organization for cognitive decision-making process is illustrated in accordance with an embodiment of the present subject matter. In one embodiment, the opportunity sensing system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the opportunity sensing system 102 to interact with the user directly or through the client devices 104. Further, the I/O interface 204 may enable the opportunity sensing system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an opportunity detection module 212, an opportunity synthesis module 214 and other modules 216. Further, the opportunity detection module 212 comprises symptoms module 222, and root cause verifier module 224. The other modules 216 may include programs or coded instructions that supplement applications and functions of the opportunity sensing system 102. The modules 208 described herein may be implemented as software modules that may be executed in the cloud-based computing environment of the opportunity sensing system 102.

The data 210, amongst other things, serves as a repository for storing data processed, received, and generated by one or more of the modules 208. Further, the data may include system data 218, and other data 220. The other data 220 may include data generated as a result of the execution of one or more modules in the other modules 216.

In one implementation, the opportunity sensing system 102 addresses the challenges observed in the existing art. More specifically, the opportunity sensing system 102 facilitates identification of the business opportunity (hereinafter alternatively referred to as opportunity) from a tremendous amount of real time data with reasoning for identifying the business opportunity and its impact to the organization. Further, the opportunity sensing system 102 synthesizes a business opportunity identified from a set of business opportunities corresponding to an organization for a cognitive decision-making process. Examples of business opportunity may be "Preventing Churn of Customers Opportunity" "Excess Stock Prevention Opportunity" in shopping mall. In one aspect, the excess stock has a cost associated with it and thus, preventing it will cause a net saving. In other aspect, preventing churn of customer has a loss of revenue over the life span of the customer associated with it. Thus upon identifying the business opportunity along with its reason is critical so that a user may take further action.

In the embodiment, the opportunity detection module 212 may receive a set of business opportunities from a user within an organization and generate one or more symptoms associated with the one or more business opportunities from the set of business opportunities based on metadata. In one example, the metadata may comprise descriptions of data streams to be examined, business goals to be considered, business policies to be followed, predefined thresholds to be used for determining interestingness of the opportunity. In one example, the description of real-time data stream to be filtered may comprise the location of data origin, data type, data structure, frequency of data. Further business goal and business policies may be set by the organization. Furthermore, predefined threshold of interestingness of the opportunity ness may be an amount of profit/loss that the business opportunity indicates, or an importance of a business opportunity. In one example, the symptoms may comprise patterns and instructions for collecting data corresponding to the pattern. Upon generating the one or more symptoms, the opportunity detection module 212 may generate a matrix mapping the business opportunity and the symptoms. In one example, multiple business opportunity may be mapped to a single symptom and vice versa.

Referring to the business opportunity of customer churn prevention. In the example, the opportunity detection module 212 upon receiving the customer churn prevention opportunity may generate symptoms comprising patterns such as "customers not buying from last 5 day" "customers reducing total amount of spend over last 3 transaction". The duration of "last 5 day" and "last 3 transactions" may be predefined or may be obtained from the user or the general knowledge. Further, the symptoms may comprises instructions to collect database on the symptoms.

Further, in the embodiment, the symptoms module 222 may receive a set of batch data associated with the business opportunity and corresponding to the symptoms. In one example, the set of batch data may be developed based on filtering of real time data using the one or more symptoms. Upon receiving, the symptoms module 222 may obtain addition metadata data associated with the business opportunity. In one example, the metadata may comprise one or more of historical data associated with the symptom, historical data associated with object being analyzed by the symptom for example, customers, location, competitors and the like. Further to obtaining, the symptoms module 222 may detect one or more symptoms for the set of symptoms based on analysis of the set of data and the metadata. In one example, the detection may be understood as eliminating errors, deviations, filtering data associated with the one or more symptom in the batch data.

Referring back to the business opportunity of customer churn prevention. In the example the symptoms module 222 may receive a set of batch data, comprising a list of customers, associated with customer churn prevention opportunity and corresponding to the symptom "customers not buying from last 5 day" "customers reducing total amount of spend over last 3 transaction". Further, the set of batch data may be developed based on filtering of real time data from point of sale units located in the shopping mall using the symptoms. Upon receiving, the symptoms module 222 may obtain metadata data associated with the business opportunity. In one example, the metadata may comprise one or more of historical data associated with the symptom, historical data associated with customers, profile data of the customers, computers data. Further to obtaining, the symptoms module 222 may detect one or more customers falling in the symptom "customers not buying from last 5 day" and deviating from their regular buying pattern. For example, John, who regularly buys after 3 days and Ron who buys after every 4 days, both have not bought from last 5 days is detected, whereas Jane who regularly buys every week is filtered, as she has not deviated. For identifying churn of Jane, another churn opportunity with a symptom of "customers not buying from last 7 days" may be generated.

Furthermore, in the embodiment, the root cause verifier module 224 may generate a reason associated with the detected one or more symptom, for example why the symptom has occurred, based on execution of a root cause analysis methodology using the metadata data. In one example, the reasons for the existence of the symptom may be selected from a predefined template based on the analysis of the set of batch data and the metadata. In one example, the metadata may comprise indications and data points of the reason of the symptoms. In the example, the indications and data points in the metadata may be extrapolated to generate a reason using the root cause analysis methodology. Root cause analysis may be understood a method of problem solving used for identifying the root causes of a problem/symptom. In other mores, the primary aim of root cause analysis is to identify the factors that resulted in the nature, the magnitude, the location, and the timing of the symptom. The reason may be one of a present/absent or conclusive/inconclusive. Further, the reason may comprise a write up generated using natural language process or selected from a templet and indications/data points from the metadata. Further to generating, the root cause verifier module 224 may identify a business opportunity from the set of business based on the generated reason. In one example, if the generated reason is yes or conclusive the business opportunity associated with the reason is identified.

Referring again to the business opportunity of customer churn prevention. In the example the root cause verifier module 224 may generate a reason associated with each of one or more customers falling in the symptom "customers not buying from last 5 day" and deviating from their regular buying pattern, for example John and Ron. In one example, the reason may comprise data on why the symptom has occurred, based on execution of a root cause analysis methodology using the metadata data. In John, the metadata associated with the Jane may comprise his details as he is a student in the university and he is from Germany. Further, the metadata may comprise local news and information such as the university is closed for Christmas. The root cause verifier module 224 may generate a reason based on the metadata that John may be on vacation and hence is not buying. Further, in case of Ron, the metadata may comprise data indicating that he is working in a local office and is from the local area. Further, the metadata may have local information such that the office has not declared any holidays. The root cause verifier module 224 may generate a reason that no reason for deviation available and inconclusive. Further to generating, the root cause verifier module 224 may identify that Ron is a business opportunity based on the generated reason. Further, the user of the organization may generate a strategy to prevent Ron's churning.

In the embodiment, upon identifying the opportunity detection module 212 may append the one or more symptoms detected, and the reason generated to the business opportunity. Further, upon receiving one or more requests from the user the opportunity detection module 212 may display a status of business opportunity identification, list of error logs, the business opportunity, one or more symptoms, and the reason to the user. Furthermore, the opportunity detection module 212 may generate a report based on the user request.

Upon identifying data, the opportunity synthesis module 214 may generate a human readable document corresponding to the identified business opportunity using natural language generation. The document may comprises detail description on the business opportunity, the symptoms and the reason for its identification. Referring to the example, of churn prevention, the opportunity synthesis module 214 may generate a document identifying churn of customers and comprising a list of the customer that may churn and the reasons of churn.

Figure 3:
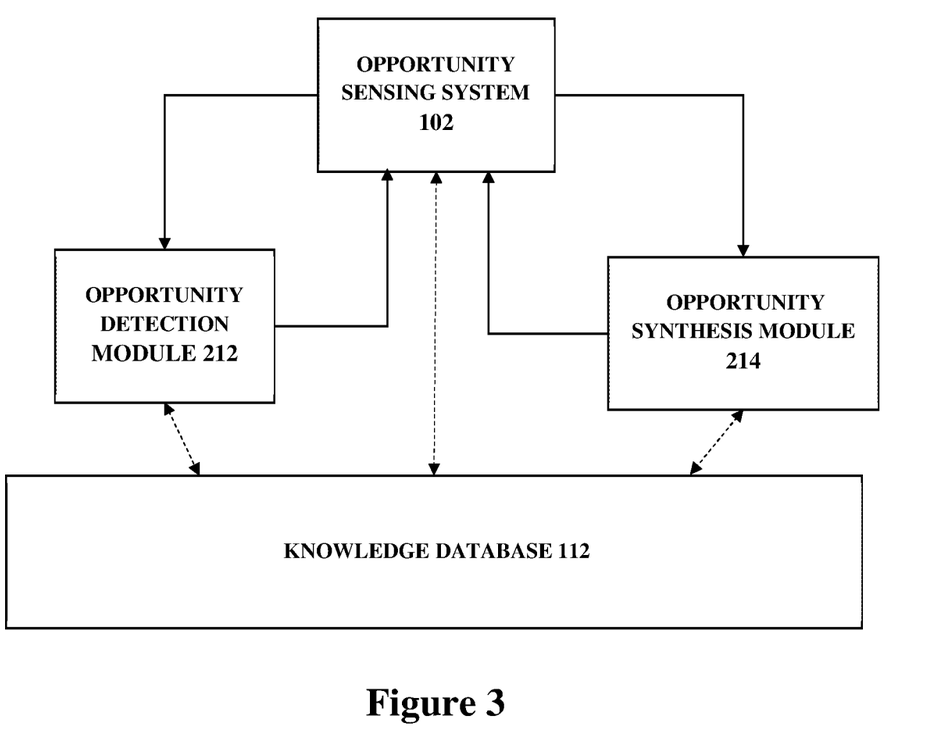
FIG. 3 illustrates a message flow in the opportunity sensing system, in accordance with an embodiment of the present disclosure.
Figure 4:
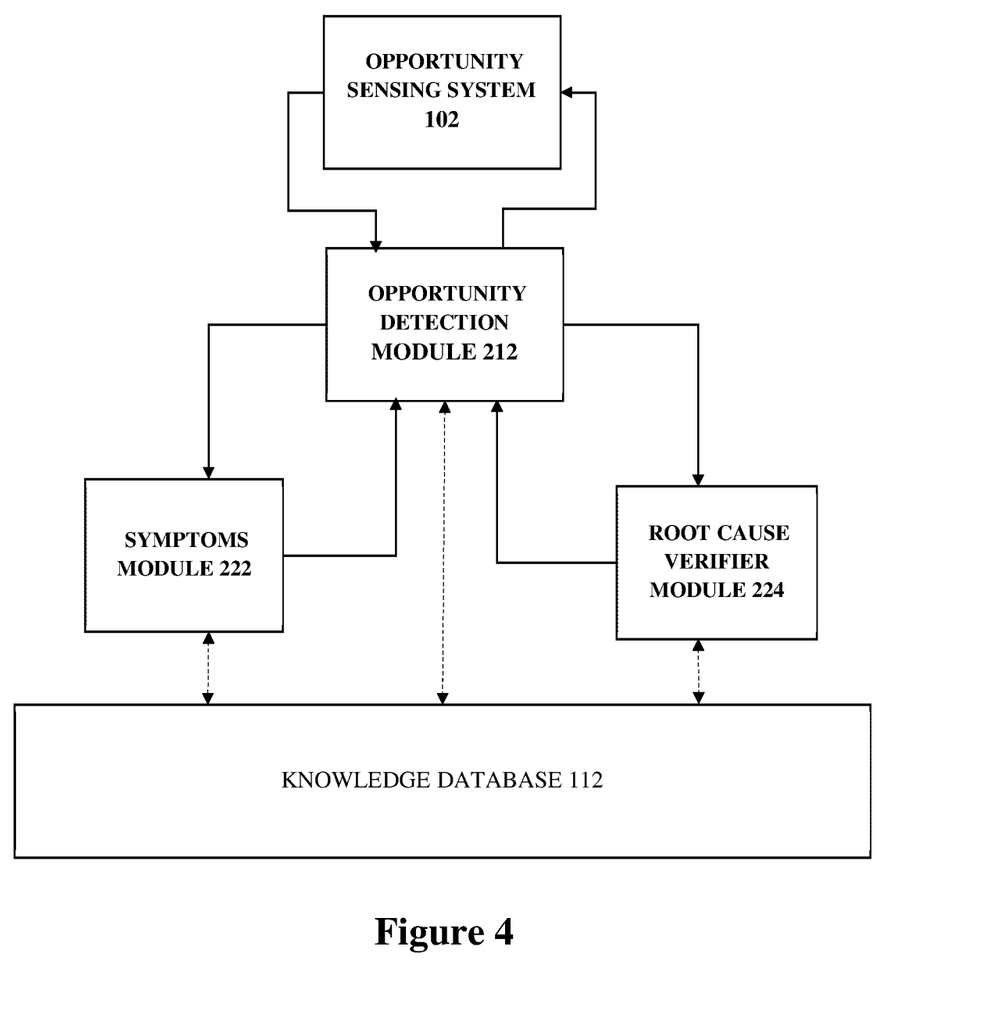
FIG. 4 illustrates a message flow in the opportunity detection system, in accordance with an embodiment of the present disclosure.

Now refereeing to the rest of the figures. FIG. 3 illustrates a message flow in the opportunity sensing system, 102, and FIG. 4 illustrates a message flow in the opportunity detection system. Further, the succeeding detailed description of the opportunity sensing system 102 along with other components, their interactions is explained by referring to FIG. 2, FIG. 3 and FIG. 4.

In one implementation, an opportunity sensing system 102 receives stream of opportunity input packages, interchangeably referred to as a set of batch data from external Perceptual System Module (not shown). Further, table 1 below shows top-level message types used by opportunity sensing system 102.

TABLE 1

Top-level message types used by Opportunity sensing system
Top-Level Message Types used by Opportunity sensing system 102

| Message # Type | Producer Module | Consumer Module | Description |
|---|---|---|---|
| 1 Sensing-Start | Perceptual System Module | Opportunity sensing system | This message triggers the sensing, activity for a new batch of input data. |
| 2 O-D-Start (Opportunity Detection Start) | Opportunity sensing system | Opportunity Detection Module | Messages of this type are emitted for each Opportunity Type for detecting opportunity on the received batch of input data by the opportunity sensing system. |
| 3 O-D-Done (Opportunity Detection Done) | Opportunity Detection Module | Opportunity sensing system | This message is emitted when the detection activity is completed for an opportunity type. It can have the response status of either FOUND or NOT-FOUND. |
| 4 O-S-Start (Opportunity Synthesis Start) | Opportunity sensing system | Opportunity Synthesis Module | This message is emitted after receiving an O-D-Done message with response status FOUND. |
| 5 O-S-Done (Opportunity Synthesis Done) | Opportunity Synthesis Module | Opportunity sensing system | This message is emitted after completion of opportunity synthesis for a new opportunity instance. |
| 6 Strategy-Start | Opportunity sensing system | Strategy Planning Module | This message triggers the start of strategy planning for a new opportunity instance. |

In the implementation, opportunity sensing system 102 function in multiple phases such as initiation phase, execution phase termination phase. In one example, below description explains an overview of the behavior of the opportunity sensing system 102 through various phases. In one example of the initialization phase, upon start opportunity sensing system 102 performs the following initialization activities:

/* Set up connections to external message queues */
1. Using Messaging service, register as consumer to Sensing-Start messages queue, created by Opportunity sensing System.
2. Using Messaging service, register as producer to Strategy-Start messages queue created by Opportunity sensing System.

/* Set up message queues for communication with internal components */
3. Using messaging service, create O-D-Start, O-D-Done, O-S-Start, and O-S-Done message queues.
4. Register as producer to O-D-Start and O-S-Start message queues
5. Register as consumer to O-D-Done and O-S-Done message queues /* Instantiate Opportunity Type Knowledge Objects */
6. Get the count; say #o-types, of pre-defined opportunity types in the system from the Knowledge database 112.
7. Create an Opportunity Types Knowledge Object (OTS-KO) in memory, as a collection of #o-types Opportunity Type Knowledge Objects. Each Opportunity Type Knowledge Object (OT-KO) follows Opportunity Type Knowledge Schema and has a unique identifier OT-ID that can be used to reference the corresponding object.
8. Initialize all Opportunity Type Knowledge Objects by reading the opportunity type specifications from the Knowledge Module. In one example, opportunity type specifications may be read once in its entirety from the knowledge base stored on a storage device, when the opportunity detection module is started and cached in memory (interchangeably referred to as system data 218) for subsequent reference. Alternatively, you may keep in memory OT-ID and partial information may be keep in the memory about opportunity type and fetch the rest from knowledge database 112 as needed.

/* Start Internal Component Modules */
9. Start Opportunity detection module 212, passing it the reference to OTS-KO, the Opportunity Types Knowledge Object.
10. Start Opportunity Synthesis Module 214, passing it the reference to OTS-KO, the Opportunity Types Knowledge Object.

In one example in the execution phase, after completing initialization activities, opportunity-sensing system 102 executes the following concurrent activities.

/* Listen to normal messages from component modules 212 and 214 */

11. Upon receiving an O-D-Done (opportunity detection done) message from Opportunity Detection Module, perform the following:
    a. If the message response status is NOT FOUND, do nothing.
    b. If the message response status is FOUND, create a new message O-S-start message with reference to object . . . . Append the O-S-Start message to the O-S-Start messages queue.
2. Upon receiving an O-S-Done (opportunity synthesis done), create a new Strategy-Start message, include a reference and append the message to Strategy-Start messages queue.

/* Listen to exception/error messages from component modules 212 and 214 */

12. Upon receiving an exception message from Opportunity detection module 214 or Opportunity Synthesis Module 214, perform the following:
    a. If exception can be handled at Opportunity Sensing System 102 level, invoke exception-handling mechanism of the Opportunity Sensing Mechanism. This may involve stopping and restarting component modules 212 and/or 214. Save error and recovery logs using logging service.

/* Listen to administrative requests */

13. Administrative user can interact with Opportunity Sensing System 102 to:
    a. View the status of opportunity sensing progress
    b. View errors and logs
    c. Stop and restart Opportunity detection module 212
    d. Stop and restart Opportunity Synthesis Module 214

In one example in the termination phase Opportunity Sensing System 102 continues to be active after initialization until, the system itself halts or there is some fault in the system that brings it down. In the latter case, the systems fault-recovery mechanism kicks in to restart Opportunity Sensing System 102.

Opportunity Detection Module 212

Opportunity detection module 212 is created and started (restarted in case of failures) by the opportunity sensing system 102. Opportunity detection module 212 is responsible for sensing an opportunity in the opportunity input package. It does so by invoking two other modules—Symptoms Module 222 and Root-Cause Verifier Module 224.

Opportunity detection module 212 instantiates Symptoms Module 222 and root cause verifier module 224 as needed or may activate a pool of Symptoms Modules 212 and root cause verifier 224 modules for each opportunity type, during its initialization phase. Further, in on example, table 2 shows top-level message types used by opportunity detection module 212.

TABLE 2

Top-level message type used by opportunity detection module
Message Types used by Opportunity detection module 212

| Message # | Message Type | Producer Module | Consumer Module | Description |
|---|---|---|---|---|
| 1 | O-D-Start (Opportunity Detection Start) | Opportunity sensing system 102 | Opportunity Detection Module 212 | This message triggers opportunity detection pipeline |
| 2 | S-D-Start (Symptoms Detection Start) | Opportunity Detection Module 212 | Symptoms Detector Module 222 | This message triggers symptoms detection for an opportunity type by a Symptoms Module |
| 3 | S-D-Done (Symptoms Detection Done) | Symptoms Module 222 | Opportunity Detection Module 212 | This message is emitted after completion after receiving S-D-Start. The status of the message is either FOUND or NOT FOUND. |
| 4 | R-V-Start (Root Cause Verification Start) | Opportunity Detection Module 212 | Root Cause Verifier Module 224 | This message triggers root-cause verification activity for an opportunity type by a root cause verifier module. This message is emitted after an S-D-Done message with FOUND status. |
| 5 | R-V-Done (Root Cause Verification Done) | Root Cause Verifier Detection Module 224 | Opportunity Detection Module 212 | This message is emitted after completion of root cause verification. The status of the message is either VERIFIED or NOT VERIFIED. |
| 6 | O-D-Done (Opportunity Synthesis Start) | Opportunity Detection Module 212 | Opportunity sensing system 102 | This message is emitted after receiving an R-V-Done message. Its response status is set to FOUND, if the response status of R-V-DONE message response status is VERIFIED otherwise it is set to NOT-FOUND. |

In the implementation, opportunity detection system 212 function in multiple phases such as initiation phase, execution phase termination phase. In one example, below description explains an overview of the behavior of the opportunity detection system 212 through various phases. In one example of the initialization phase, upon start opportunity detection system 102 performs the following initialization activities:

/* Set up connections to external message queues */

1. Using Messaging service, register as consumer to O-D-Start messages queue, created by Opportunity Sensing System.
2. Using Messaging service, register as producer to O-D-Done messages queue created by Opportunity Sensing System.

/* Set up message queues for communication with instances of internal components 222 and 224* / In one example, if there are 4 opportunity types in OTS-KO, there will be 20 message queues created, 4 for each opportunity type 3. For entries in Opportunity Types Knowledge Object (OTS-KO):
    a. Get the next entry (Opportunity Type Knowledge Object), say OT-KO
    b. Using messaging service, create S-D-Start, S-D-Done, R-V-Start, and R-V-Done message queues for opportunity type OT-KO.
    c. Register as producer to S-D-Start and R-V-Start message queues.

d. Register as consumer to S-D-Done and R-V-Done message queues.

/* create instances of Symptoms Module 222 and Root Cause Verifier Module 224*/ in one example, if there are 4 opportunity types in OTS-KO, there will be 4 instances of each Symptoms Module 222 and Root Cause Verifier Module 224, one for each opportunity type)

4. For entries in Opportunity Types Knowledge Object (OTS-KO):
   a. Get the next entry (Opportunity Type Knowledge Object), say OT-KO
   b. Start an instance of Symptoms Module 222 passing it the reference to OT-KO
   c. Start an instance of Root-Cause Verifier Module 224 passing it the reference to OT-KO In one example at the execution phase, after completing initialization activities, opportunity detection module 212 executes the following activities concurrently:

/* Listen to normal messages from component modules 222 and 224*/

5. Upon receiving a S-D-Done (symptoms detection done) message from a Symptoms Module 222, perform the following:
   a. If the response status is NOT FOUND, emit an O-D-Done (opportunity detection done) message with response status set to NOT-FOUND.
   b. If the response status is FOUND, emit an R-V-Start (Root Cause Verification Start) message.
6. Upon receiving a R-V-Done (Root Cause Verification Message Done) message from a Root Cause Verifier Module 224, perform the following:
   a. If the response status is VERIFIED, create a new Opportunity Instance Knowledge Object of the Opportunity Type in question and initialize its fields and emit an O-D-Done (Opportunity Detection Done) message with response status set to FOUND
   b. If the response status is NOT VERIFIED, emit an O-D-Done (opportunity detection done) message with response status set to NOT-FOUND.

/* Listen to exception/error messages from component modules 222 and 224*/

7. Upon receiving an exception message from Symptoms Detection Module 222 or Root Cause Verifier Module 224, perform the following:
   a. If exception can be handled at Opportunity Detection Module 212 level, invoke exception-handling mechanism of the Opportunity Detection Module 212. This may involve stopping and restarting Symptoms Module 222 and Root Cause Verifier Module 224; otherwise forward an exception message to Opportunity Sensing System 102. Save error and recovery logs using logging service.

/* Listen to administrative requests */

8. Administrative user can interact with Opportunity Detection Module 212 to:
   a. View the status of opportunity detection progress
   b. View errors and logs
   c. Stop and restart Symptoms Module 222
   d. Stop and restart Root Cause Verifier Modules 224

In one example in the termination phase opportunity detection module 212 continues to be active after initialization until, the ODS itself halts or there is some fault in the system which brings it down. In the latter case, the systems fault-recovery mechanism kicks in to restart Opportunity Detection Module 212.

Symptoms Module 222

In one implementation, several Symptoms Modules 222 may be running concurrently in the opportunity sensing system 102. Each such module is associated with an opportunity type. In a simple embodiment, there is one symptom detector module 222 for each opportunity type. In alternate embodiments, several Symptoms Modules 222 can be associated with the same opportunity type. In addition, one symptom detector module 222 can also be associated with multiple opportunity types.

Further, Symptoms Modules 22 can run on a single machine or it can be a distributed program running on a cluster of machines. All instances of Symptoms Modules 222 can be started in parallel on different machines in a cluster of machines. One or more Symptoms Modules can also be started on a single machine. In one example, Symptoms Module 222 accepts S-D-Start (Symptoms Detection Start) message with a reference to Opportunity Input Knowledge Object and after execution, it emits either S-D-Done (Symptoms Detection Done) message with response status set to FOUND or NOT-FOUND.

In the implementation, Symptoms Module 222 function in multiple phases such as initiation phase, execution phase termination phase. In one example, below description explains an overview of the behavior of the Symptoms Module 222 through various phases. In one example of the initialization phase, upon start Symptoms Module 222 performs the following initialization activities: In one example, let OT is the opportunity type associated with this instance (available from the parameter opportunity type knowledge object, OT-KO, passed with the start request.)

/* set up connections to external message queues */

1. Using Messaging service, register as consumer to S-D-Start messages queue for opportunity type OT, created by Opportunity Detection Module 212.
2. Using Messaging service, register as producer to S-D-Done messages queue for opportunity type OT, created by Opportunity Detection Module 214.

/* configure symptoms detection pipeline code */

1. From the associated Opportunity Type Knowledge Object, OT-KO, get the array of symptoms (OT-Symptoms) and/or the array of methods/functions (OT-Symptom-Checking-Functions). OT-Symptom-Checking-Functions are analytics programs that are used to detect a well-defined pattern (corresponding to a symptom) in opportunity input package.
2. Using the information from step 4, code symptoms detection pipeline code in the symptoms detector instance.

Execution Phase—After initialization, Symptoms Module 222 runs in a loop performing the following:

/* Listen to message S-D-Start (Symptoms Detection Start) from Opportunity Detection Module 212 */

1. Upon receiving an S-D-Start message, perform the following:
   a. Get Opportunity Input Knowledge Object (OI-KO)
   b. Process OI-KO through symptoms detection pipeline
   c. If one or more symptoms are detected, create a new Opportunity Detection Knowledge Object (OD-KO), initialize it with the detection information and emit an S-D-Done (symptoms detection done) message with response status set to FOUND.
   d. If no-symptom is found, emit an S-D-Done (symptoms detection done) message with response status set to NOT-FOUND
   e. Using logging service, log a symptoms detection record.

In one example in the termination phase Symptoms Module 222 may be started/restarted at the beginning of each iteration of the detection loop and terminated at the end of the iteration. Alternately, these programs can be kept running waiting for the next iteration after processing opportunity input package for the current iteration. If a Symptoms Module 222 halts because of failure, the systems fault-recovery mechanism kicks in to restart the symptoms detection module 222.

Root-Cause Verifier Module 224

In one implementation, a Root-Cause Verifier Module 224 performs additional analysis after one or more symptoms have been detected in the opportunity input package by a symptoms detection module 222. Further, several Root-Cause Verifier modules 224 may be running concurrently in the system. Each such module 224 is associated with an opportunity type and a symptom. In one embodiment, there is a single Root-Cause Verifier module 224 for each opportunity type. In alternate embodiments, several Root-Cause Verifier modules 224 can be associated with the same opportunity type. In addition, a single Root Cause Verifier module 224 can also be associated with multiple opportunity types. In the implementation, Root Cause Verifier modules 224 can run on a single machine or it can be a distributed program running on a cluster of machines. All instances of Root Cause Verifier modules 224 can be started in parallel on different machines in a cluster of machines. One or more Root Cause Verifier modules 224 can also be started on a single machine.

In one example, the Root Cause Verifier module 224 accepts R-V-Start (Root Cause Verification Start) message with references to Opportunity Input Knowledge Object (OI-KO) and Opportunity Detection Knowledge Object (OD-KO) and after execution, it emits R-V-Done (Root Cause Verification Done) message with response status set to either VERIFIED or NOT VERIFIED.

In the implementation, Root Cause Verifier modules 224 function in multiple phases such as initiation phase, execution phase termination phase. In one example, below description explains an overview of the behavior of the Root Cause Verifier modules 224 through various phases. In one example of the initialization phase, upon start Root Cause Verifier module 224 performs the following initialization activities. In one example, let OT be the opportunity type associated with this instance (available from the parameter opportunity type knowledge object, OT-KO, passed with the start request.)

/* set up connections to external message queues */
1. Using Messaging service, register as consumer to R-V-Start messages queue for opportunity type OT, created by Opportunity Detection Module.
2. Using Messaging service, register as producer to R-V-Done messages queue for opportunity type OT, created by Opportunity Detection Module.
/* configure root cause verification pipeline code */
1. From the associated Opportunity Type Knowledge Object, OT-KO, get the array of root causes (OT-Root-Causes) and/or the array of methods/functions (OT-Root-Cause-Checking-Functions). OT-Root-Cause-Checking-Functions are analytics programs that are used to detect a well-defined pattern (corresponding to a root cause) in opportunity input package or the metadata.
2. Using the information from step 4, configure root cause verification pipeline code in the root cause verifier.

In one example in the execution phase, after initialization, Root Cause Verifier Module 224 runs in a loop executing the following steps:

/* Listen to message R-V-Start (Root Cause Verification Start) from Opportunity Detection Module 212 */
1. Upon receiving an R-V-Start message, perform the following:
   a. Get Opportunity Input Knowledge Object (OI-KO) and Opportunity Detection Knowledge Object (OD-KO).
   b. Process OI-KO & OD-KO through root cause verification pipeline
   c. If one or more root causes are verified, update the Opportunity Detection Knowledge Object (OD-KO) with verification information and emit an R-V-Done (root cause verification done) message with response status set to VERIFIED.
   d. If no root cause is verified, emit an R-V-Done (root cause verification done) message with response status set to NOT-VERIFIED.
   e. Using logging service, log a root cause verification record.

In one example in the termination phase, Root Cause Verifier 224 modules may be started/restarted at the beginning of each iteration of the detection loop and terminated at the end of the iteration. Alternately, these programs can be kept running waiting for the next iteration after processing opportunity input package for the current iteration. If a root cause verifier module 224 halts because of failure, the systems fault-recovery mechanism kicks in to restart the Root Cause Verifier Module 224.

Figure 5:
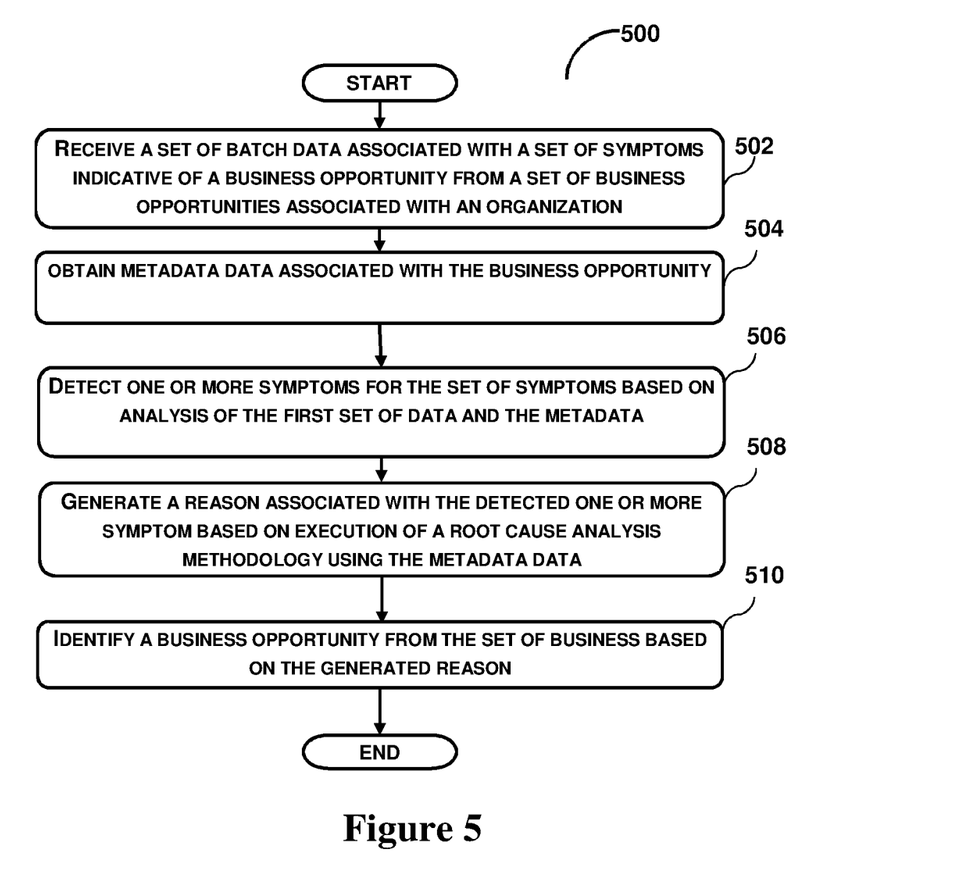
FIG. 5 illustrates a method to identify a business opportunity from a set of business opportunities associated with an organization for cognitive decision making process, in accordance with an embodiment of the present disclosure The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

Referring now to FIG. 5, a method 500 to identify a business opportunity from a set of business opportunities associated with an organization for cognitive decision-making process, is disclosed in accordance with an embodiment of the present subject matter. The method 400 to identify a business opportunity from a set of business opportunities associated with an organization for cognitive decision-making process may be described in the general context of device executable instructions. Generally, device executable instructions can include routines, programs, objects, components, data structures, procedures, modules, functions, and the like, that perform particular functions or implement particular abstract data types. The method 500 to identify a business opportunity from a set of business opportunities associated with an organization for cognitive decision-making process may also be practiced in a distributed computing environment where functions are performed by remote processing systems that are linked through a communications network. In a distributed computing environment, computer executable instructions may be located in both local and remote computer storage media, including memory storage systems.

The order in which the method 500 to identify a business opportunity from a set of business opportunities associated with an organization for cognitive decision-making process is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method 500 can be implemented in any suitable hardware, software, firmware, or combination thereof. However, for ease of explanation, in the embodiments described below, the method 500 to identify a business opportunity from a set of business opportunities associated with an organization for cognitive decision-making process may be considered to be implemented in the above-described opportunity sensing system 102.

At block 402, a set of batch data associated with a set of symptoms indicative of a business opportunity from a set of business opportunities associated with an organization may be received. In one example, each of the one or more symptoms may comprise a pattern and instruction to collate data associated with the pattern, and the set of batch data may comprise data filtered from a real-time stream of data based on the one or more symptoms. In one embodiment, the symptoms module 222 may receive a set of batch data. Further, the symptoms module 222 may store the set of batch data in the system data 218.

At block 404, metadata data associated with the business opportunity may be obtained. In one example, the metadata comprises one or more of historical data associated with the one or more symptom. In one embodiment, the symptoms module 222 may obtain metadata data. Further, the symptoms module 222 may store the metadata in the system data 218.

At block 406, one or more symptoms for the set of symptoms may be detected based on analysis of the first set of data and the metadata. In one embodiment, the symptoms module 222 may detect one or more symptoms for the set of symptoms. Further, the symptoms module 222 may store the one or more symptoms in the system data 218.

At block 408, a reason associated with the detected one or more symptom may be generated based on execution of a root cause analysis methodology using the metadata data. In one embodiment, the root cause verifier module 224 may generate reason for the symptom. Further, the root cause verifier module 224 may store the reason in the system data 218.

At block 410, a business opportunity may be identified from the set of business based on the generated reason. In one embodiment, the root cause verifier module 224 may identify the business opportunity. Further, the root cause verifier module 224 may store the business opportunity in the system data 218.

Although implementations for methods and systems to identify a business opportunity from a set of business opportunities associated with an organization for cognitive decision making process have been described in language specific to structural features and/or methods, it is to be understood that the appended claims are not necessarily limited to the specific features or methods to identify a business opportunity from a set of business opportunities associated with an organization for cognitive decision making process described. Rather, the specific features and methods are disclosed as examples of implementations to identify a business opportunity from a set of business opportunities associated with an organization for cognitive decision-making process.

The invention claimed is:

1. A method to identify an opportunity from a set of opportunities associated with an organization for cognitive decision making process, wherein the method comprises:
receiving, by a processor, a set of batch data associated with one or more symptoms indicative of an opportunity type from a set of opportunities associated with an organization, wherein each symptom of the one or more symptoms comprises a pattern and an instruction to collate data associated with the pattern, and wherein the set of batch data comprises data filtered from a real-time stream of data based on the one or more symptoms;

obtaining, by the processor, metadata associated with the opportunity type, wherein the metadata comprises one or more of historical data associated with the one or more symptoms;

identifying, by the processor, a symptom of the one or more symptoms based on an analysis of the set of the batch data and the metadata, wherein the identification indicates eliminating errors, deviations, filtering data associated with the one or more symptoms in the set of the batch data;

generating, by the processor, a reason associated with the symptom identified based on an execution of a root cause analysis methodology using the metadata, wherein the reason associated with the symptom is selected from a predefined template based on the analysis of the set of batch data and the metadata, and wherein the reason associated with the symptom is generated upon extrapolating data points in the metadata using the root cause analysis methodology;

identifying, by the processor, an opportunity in real time from the opportunity type based on the reason associated with the symptom, wherein the opportunity is identified using a cognitive decision making process;

appending, by the processor, the one or more symptoms identified, and the reason generated to the opportunity; and automatically generating, by the processor, a document related to the identified opportunity using a natural language generator, wherein the document contains a description of the opportunity, the one or more symptoms, and the reason associated with the symptom.

2. The method of claim 1, further comprising:
receiving, by the processor, a set of opportunities from a user within an organization; and
generating, by the processor, the one or more symptoms associated with one or more opportunity types from the set of opportunities based on a predefined threshold.

3. The method of claim 1, further comprising:
receiving, by the processor, one or more requests for the user, wherein the one or more requests comprise status of opportunity identification, list of error logs; and
generating, by the processor, a reported based on the one or more requests.

4. The method of claim 1, wherein the metadata comprises one or more descriptions of data streams to be examined, goals to be considered, policies to be followed and thresholds to be used for determining interestingness of the opportunity.

5. An opportunity sensing system to identify an opportunity from a set of opportunities associated with an organization for cognitive decision making process, wherein the opportunity sensing system comprising:
a processor; and
a memory coupled to the processor, wherein the processor is capable of executing a plurality of modules stored in the memory, and wherein the plurality of modules comprising:
receiving a set of batch data associated with one or more symptoms indicative of an opportunity type from a set of opportunities associated with an organization, wherein each symptom of the one or more symptoms comprises a pattern and an instruction to collate data associated with the pattern, and wherein the set of batch data comprises data filtered from a real-time stream of data based on the one or more symptoms;

obtaining metadata associated with the opportunity type, wherein the metadata comprises one or more of historical data associated with the one or more symptoms;

identifying a symptom of the one or more symptoms based on an analysis of the set of the batch data and the metadata, wherein the identification indicates eliminating errors, deviations, filtering data associated with the one or more symptoms in the set of the batch data;

generating a reason associated with the symptom identified based on an execution of a root cause analysis methodology using the metadata, wherein the reason associated with the symptom is selected from a pre-defined template based on the analysis of the set of batch data and the metadata, and wherein the reason associated with the symptom is generated upon extrapolating data points in the metadata using the root cause analysis methodology;

identifying an opportunity in real time from the opportunity type based on the generated reason, wherein the opportunity is identified using a cognitive decision making process;

appending the one or more symptoms identified and the reason associated with the symptom to the opportunity; and automatically generating a document related to the identified opportunity using natural language generator, wherein the document contains a description of the opportunity, the symptoms, and the reason associated with the symptom.

6. The opportunity sensing system of claim 5, further comprising:
receiving a set of opportunities from a user within an organization; and
generating the one or more symptoms associated with one or more opportunity types from the set of opportunities based on a predefined threshold.

7. The opportunity sensing system of claim 5, further comprising:
receiving one or more requests for the user, wherein the one or more requests comprise status of opportunity identification, list of error logs; and
generating a reported based on the one or more requests.

8. The opportunity sensing system of claim 5, wherein the metadata comprises one or more descriptions of data streams to be examined, goals to be considered, policies to be followed and thresholds to be used for determining interestingness of the opportunity.

9. A non-transitory computer readable medium embodying a program executable in a computing device to identify an opportunity from a set of opportunities associated with an organization for cognitive decision making process, wherein the program comprising a program code for:
receiving a set of batch data with one or more symptoms indicative of an opportunity type from a set of opportunities associated with an organization, wherein each symptom of the one or more symptoms comprises a pattern and an instruction to collate data associated with the pattern, and wherein the set of batch data comprises data filtered from a real-time stream of data based on the one or more symptoms;

obtaining metadata associated with the opportunity type, wherein the metadata comprises one or more of historical data associated with the one or more symptoms;

identifying a symptom of the one or more symptoms based on an analysis of the set of the batch data and the metadata, wherein the identification indicates eliminating errors, deviations, filtering data associated with the one or more symptoms in the set of the batch data;

generating a reason associated with the symptom identified based on an execution of a root cause analysis methodology using the metadata, wherein the reason associated with the symptom is selected from a pre-defined template based on the analysis of the set of batch data and the metadata, and wherein the reason associated with the symptom is generated upon extrapolating data points in the metadata using the root cause analysis methodology;

identifying an opportunity in real time from the opportunity type based on the generated reason, wherein the opportunity is identified using a cognitive decision making process;

appending the one or more symptoms identified and the reason associated with the symptom to the opportunity; and automatically generating a document related to the identified opportunity using natural language generator, wherein the document contains a description of the opportunity, the symptoms, and the reason associated with the symptom.

10. The non-transitory computer readable of claim 9, further comprising:
receiving a set of opportunities from a user within an organization; and
generating one or more symptoms associated with one or more opportunity types from the set of opportunities based on a predefined threshold.

11. The non-transitory computer readable of claim 9, further comprising:
receiving one or more requests for the user, wherein the one or more requests comprise status of opportunity identification, list of error logs; and
generating a reported based on the one or more requests.

12. The non-transitory computer readable of claim 9, wherein the metadata comprises one or more descriptions of data streams to be examined, goals to be considered, policies to be followed and thresholds to be used for determining interestingness of the opportunity.

* * * * *